Dec. 18, 1923.  W. DIETER  1,478,108

PACKING GASKET

Filed Oct. 20, 1919

INVENTOR
William Dieter,
By Attorneys,

Patented Dec. 18, 1923.

1,478,108

UNITED STATES PATENT OFFICE.

WILLIAM DIETER, OF BROOKLYN, NEW YORK, ASSIGNOR TO VITTLEA DEVELOPMENT CORPORATION, A CORPORATION OF DELAWARE.

PACKING GASKET.

Application filed October 20, 1919. Serial No. 331,954.

*To all whom it may concern:*

Be it known that I, WILLIAM DIETER, a citizen of the United States of America, residing in the borough of Brooklyn, county of Kings, city and State of New York, have invented certain new and useful Improvements in Packing Gaskets, of which the following is a specification.

This invention provides an improved packing gasket especially designed for joints exposed to super-high gaseous pressures. For example, in the construction of automobile torpedoes, where compressed air is stored at a pressure often exceeding 3000 pounds per square inch, and is used at working pressures approximately 500 pounds per square inch, it is difficult to make a tight joint by the means ordinarily provided. In packing joints for such high pressures various kinds of gaskets have been used, including those of leather, rubber, asbestos, copper, tin, etc., each of which has been found to have its own peculiar merits and defects. The best success has been attained with gaskets of either copper or tin, but copper has been found too hard, so that the joint is liable to leak unless the joint faces are finished with extreme accuracy; while tin is so soft that it is liable to flow into screw threads and to enter cracks or joints, being for these reasons undesirable.

The present invention provides a composite gasket which has been found under the most severe practical conditions to avoid the disadvantages of the gaskets heretofore used. It comprises a core of a hard but yielding metal such as copper, having a close approximation to the ultimate shape of the gasket, and a coating upon this core of a soft metal such as tin, or preferably an alloy consisting of 50% tin and 50% lead.

Figure 1 of the accompanying drawings shows a section of a packed joint;

Figure 1:
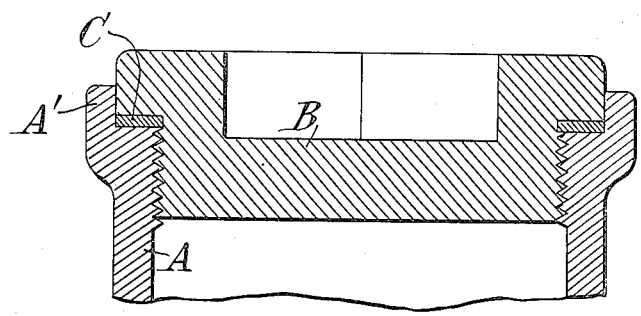
Figure 2:
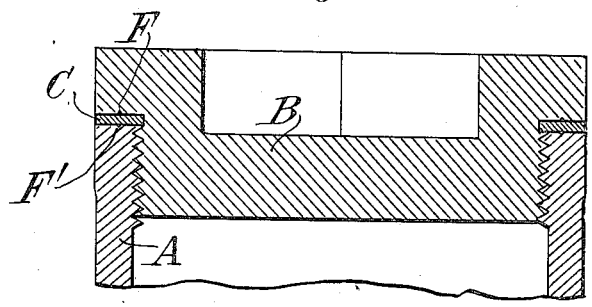
Fig. 2 shows a section of another form of packed joint.

In Figs. 1 and 2, A is a shell or tubular body, and B is a cap or closure therefor, or any part requiring a tight packing at its joint with the part A. In each figure C is the packing gasket. In Fig. 1 the part A has an outer flange A' which encloses the joint, so that the gasket is confined. In Fig. 2 there is no such flange, so that the exterior of the gasket is unconfined.

Figure 3:
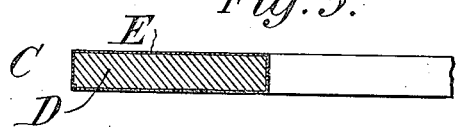
Fig. 3 is an enlarged cross-section of the gasket alone.

Fig. 3 shows the gasket in detail, being a cross-section on an enlarged scale. The inner core D is of copper, or metal having similar properties, while the outer covering or coating E is of tin or of the tin lead alloy above described, or of any other soft metal or alloy having similar properties. In practice it is preferable to punch the copper core out of sheet or plate metal, and to apply the coating by electroplating. While the dimensions are not essential to the invention, I will state for the benefit of experts in the art that for a gasket of about one inch diameter, it is preferable to make the core about 1/64th inch thick, and the coating about .005 inch thick. The preferable construction is to make the seating faces of the joint flat and parallel, and to make the gasket of washer-shape, with its opposite faces flat and parallel.

Figure 4:
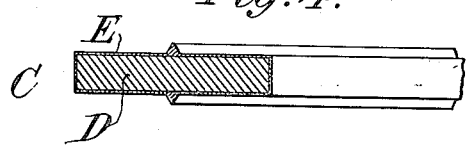
Fig. 4 is a similar cross-section of a gasket which has been used in the joint shown in Fig. 2.

It is usual and preferable in making such joints, to provide the seating faces each with one or more grooves. In Fig. 2, two such grooves F F' are shown. With such a grooved joint the soft metal facing of the packing flows under pressure as the joint is tightened, and enters more or less into the grooves after the manner shown in Fig. 4, so that it forms thereby a tighter joint than one made without the grooves. This flowing of the gasket is confined to the outer coating of soft metal.

The new gasket provided by this invention successfully fulfills all practical requirements. When subjected to pressure in closing the joint, the coating metal yields and fills all the interstices of the joint, but without escaping therefrom or flowing into screw-threads or other undesirable places slightly remote from the joint. In cases where with the old forms of gasket it was necessary to confine the gasket space by means of an outer lip or flange A', as shown in Fig. 1, this may, with the new gasket, be dispensed with, as shown in Fig. 2.

While tin is a suitable metal for the outer coating E, yet the tin lead alloy stated is preferable because being somewhat softer, it flows more readily, and also because it is cheaper.

The shape and dimensions of the gasket may be greatly varied without departing from the invention. The shape of the gasket will be determined by the shape of the joint and the nature of the abutting faces.

I claim as my invention:—

1. A packing gasket for super-high gaseous pressures having a core of substantially hard slightly yielding metal, such as copper, of nearly the full dimensions of the gasket, and a coating of softer metal forming a proportionately thin surface layer covering the abutting faces of the gasket, such softer metal being adapted to flow slightly under mechanical compression to thereby fill all interstices of the joint faces.

2. A packing gasket for super-high gaseous pressures, in the form of a flat ring having a core of substantially hard slightly yielding metal (such as copper) of nearly the full dimensions of the gasket, and a relatively thin coating of softer metal adapted under mechanical compression to flow into and fill minute interstices in the abutting faces.

3. A packing gasket for super-high gaseous pressures having an inner core of metal having substantially the resisting and slightly yielding qualities of copper of nearly the full dimensions of the gasket, and a relatively thin outer coating of soft metal alloy containing tin.

4. A packing gasket for super-high gaseous pressures having a core of copper of nearly the full dimensions of the gasket, and a relatively thin coating of a tin lead alloy.

5. A packing gasket for super-high gaseous pressures, in the form of a flat ring, having an integral core of metal (such as copper) sufficiently hard to resist flowing under mechanical compression, and a coating therefor of metal sufficiently soft to flow under mechanical compression into grooves or depressions in the surfaces between which the gasket is clamped.

6. A packing gasket for super-high gaseous pressures in the form of a flat ring, having a flat core of a metal of the resisting qualities of copper, having nearly the full dimensions of the gasket, and a surface coating of a relatively soft metal forming a proportionately thin layer on the opposite flat faces of the core.

In witness whereof, I have hereunto signed my name.

WILLIAM DIETER.